(12) United States Patent
Simonson et al.

(10) Patent No.: US 10,909,272 B2
(45) Date of Patent: Feb. 2, 2021

(54) STORAGE COMPUTE APPLIANCE WITH USER AUTHENTICATION AND MEMORY ALLOCATION CAPABILITIES

(71) Applicant: Seagate Technology LLC, Cupertino, CA (US)

(72) Inventors: Dana Lynn Simonson, Owatonna, MN (US); Stacey Secatch, Longmont, CO (US); Kristofer C. Conklin, Burnsville, MN (US); Robert Wayne Moss, Windsor, CO (US)

(73) Assignee: Seagate Technology LLC, Fremont, CA (US)

( * ) Notice: Subject to any disclaimer, the term of this patent is extended or adjusted under 35 U.S.C. 154(b) by 216 days.

(21) Appl. No.: 15/885,144

(22) Filed: Jan. 31, 2018

(65) Prior Publication Data

US 2019/0236317 A1 Aug. 1, 2019

(51) Int. Cl.
| | |
|---|---|
| *G06F 21/78* | (2013.01) |
| *G06F 21/31* | (2013.01) |
| *H04L 9/32* | (2006.01) |
| *G06F 3/06* | (2006.01) |
| *G06F 9/50* | (2006.01) |
| *H04L 9/08* | (2006.01) |

(52) U.S. Cl.
CPC .............. *G06F 21/78* (2013.01); *G06F 3/068* (2013.01); *G06F 3/0619* (2013.01); *G06F 3/0623* (2013.01); *G06F 3/0679* (2013.01); *G06F 9/5016* (2013.01); *G06F 21/31* (2013.01); *H04L 9/088* (2013.01); *H04L 9/3271* (2013.01)

(58) Field of Classification Search
CPC ........ G06F 3/061; G06F 21/78; G06F 3/0688; G06F 3/0604; G06F 3/0653; G06F 16/13; G06F 3/0631; G06F 3/068; G06F 3/0619; G06F 9/5016; G06F 21/31; G06F 21/79; G06F 3/062; G06F 3/0637; G06F 3/0679
See application file for complete search history.

(56) References Cited

U.S. PATENT DOCUMENTS

| | | | |
|---|---|---|---|
| 5,646,993 | A | 7/1997 | Alzawa |
| 6,993,195 | B2 | 1/2006 | Olivieri |
| 7,227,952 | B2 | 6/2007 | Qawami et al. |
| 7,302,571 | B2 | 11/2007 | Noble et al. |

(Continued)

*Primary Examiner* — Trang T Doan
(74) *Attorney, Agent, or Firm* — Hall Estill Attorneys at Law

(57) ABSTRACT

Method and apparatus for managing data in a data storage device configured as a storage compute appliance. In some embodiments, the data storage device has a controller circuit and a non-volatile memory (NVM) with an overall data storage capacity. A processor authenticates each of a plurality of authorized users of the NVM via data exchanges between a host device and the processor without reference to an external authentication authority device. Upon authentication, each authorized user is allocated a separate portion of the overall data storage capacity of the NVM using an allocation model. The size of at least one of the separate portions is subsequently adjusted based on an access history of the NVM. The storage device may be a key-value storage device so that a separate set of key values is provided to each authorized user to identify data blocks stored to and retrieved from the NVM.

20 Claims, 5 Drawing Sheets

(56) References Cited

U.S. PATENT DOCUMENTS

| | | | |
|---|---|---|---|
| 7,330,957 B2* | 2/2008 | Miyazaki | G06F 3/0605 |
| | | | 711/170 |
| 7,380,140 B1 | 5/2008 | Weissman et al. | |
| 7,743,409 B2 | 6/2010 | Gonzalez et al. | |
| 7,844,711 B2* | 11/2010 | Kobayashi | G06F 3/0608 |
| | | | 709/226 |
| 8,925,100 B2 | 12/2014 | Chase | |
| 9,128,745 B2* | 9/2015 | Crudele | G06F 3/0631 |
| 9,575,618 B2* | 2/2017 | Yamasani | G06F 3/048 |
| 9,613,205 B2 | 4/2017 | Steeves et al. | |
| 9,760,695 B2 | 9/2017 | Manago et al. | |
| 2002/0091643 A1* | 7/2002 | Okamoto | G06Q 30/06 |
| | | | 705/53 |
| 2010/0031349 A1 | 2/2010 | Bingham | |
| 2011/0154443 A1* | 6/2011 | Thakur | G06F 21/41 |
| | | | 726/3 |
| 2012/0124183 A1* | 5/2012 | Long | G06F 3/0659 |
| | | | 709/219 |
| 2015/0278260 A1* | 10/2015 | Ramos | G06F 16/2358 |
| | | | 707/609 |
| 2015/0286436 A1* | 10/2015 | Olson | G06F 3/0619 |
| | | | 711/162 |
| 2017/0131902 A1* | 5/2017 | Goss | G06F 3/0655 |
| 2017/0237563 A1* | 8/2017 | El-Moussa | G06F 3/0659 |
| | | | 713/193 |
| 2017/0264431 A1* | 9/2017 | Mattsson | G06F 21/6236 |
| 2018/0211033 A1* | 7/2018 | Aditham | G06F 21/316 |
| 2020/0027014 A1* | 1/2020 | Wen | G06F 9/5077 |

* cited by examiner

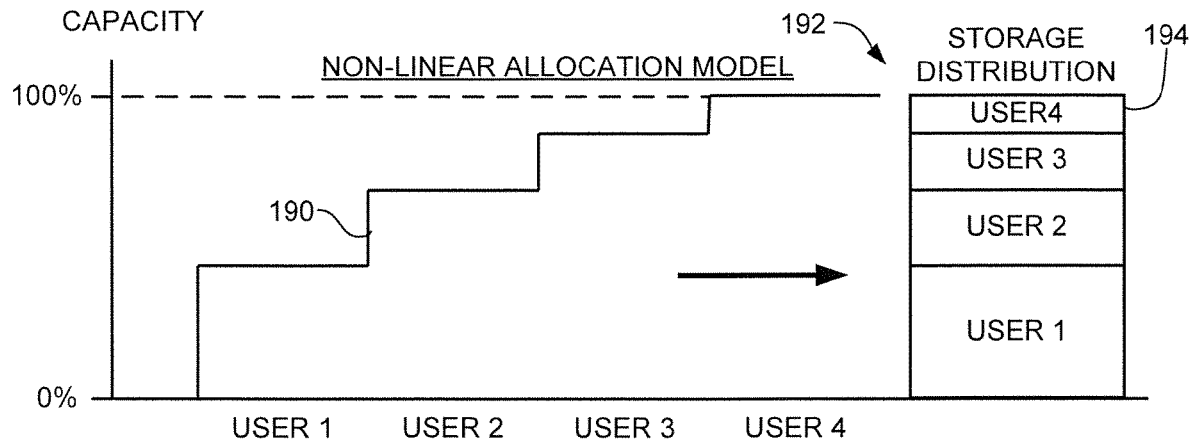
FIG. 10
ALLOCATION TABLE FORMAT
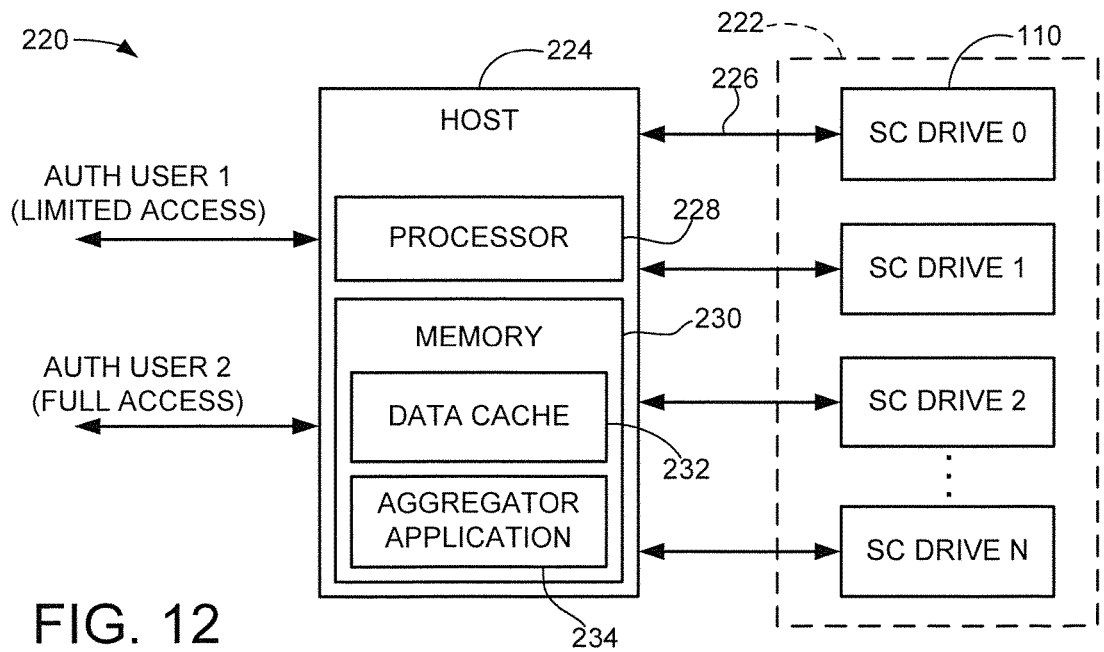
FIG. 11
FIG. 12

SOLID STATE DRIVE (SSD) STORAGE COMPUTE APPLIANCE

HARD DISC DRIVE (HDD)/HYBRID DRIVE STORAGE COMPUTE APPLIANCE

STORAGE COMPUTE APPLIANCE WITH USER AUTHENTICATION AND MEMORY ALLOCATION CAPABILITIES

SUMMARY

Various embodiments of the present disclosure are generally directed to a data storage device configured as a storage compute appliance with self-authenticating and data allocation capabilities.

In some embodiments, the data storage device has a non-volatile memory (NVM) and a controller circuit. A processor authenticates each of a plurality of authorized users of the NVM via data exchanges between a host device and the processor without reference to an external authentication authority device, such as a trusted server. Upon authentication, each authorized user is allocated a separate portion of the overall data storage capacity of the NVM using an allocation model. The size of at least one of the separate portions is subsequently adjusted based on an access history of the NVM.

These and other features and advantages of various embodiments of the present disclosure can be understood from a review of the following detailed description in conjunction with the accompanying drawings.

BRIEF DESCRIPTION OF DRAWINGS

FIG. 10 illustrates a non-linear allocation model that can be used by the appliance to allocate separate portions of the NVM to different authorized user host devices in further embodiments.

FIG. 11 shows an example format for the allocation table of FIG. 4 in some embodiments.

FIG. 12 shows another embodiment in which multiple storage compute appliances are utilized in tandem to process data in further embodiments.

DETAILED DESCRIPTION

Figure 1:
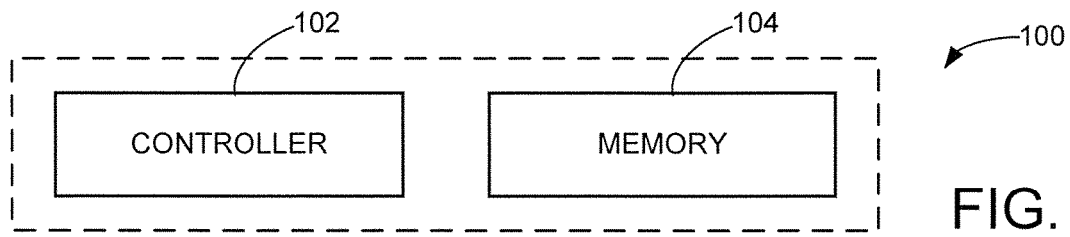
FIG. 1 is a functional block diagram of a data storage device configured and operated accordance with some embodiments.

The present disclosure is generally directed to data storage systems, and more particularly to configuring a data storage device as a storage compute appliance to securely process confidential data.

Data storage devices store and retrieve user data in a fast and efficient manner. A data storage device generally includes a top level controller circuit and a non-volatile memory (NVM). The controller circuit operates to store user data to, and retrieve the user data from, the NVM. The NVM can take any number of forms, including solid state semiconductor memory such as in the form of flash memory and rotatable recording media such as in the form of one or more rotatable magnetic recording discs.

Data security schemes are implemented in data storage devices to prevent or reduce the ability of an unauthorized party from gaining access to stored data. A variety of data security schemes have been implemented in the art, including the use of authentication processing to restrict access to a drive by authorized users, and data encryption to encrypt user data stored to the drive by the authorized users.

In a shared storage environment, data sets from multiple owners (e.g., different users, host devices, processes, etc.) are stored on the same storage device or group of storage devices. The data belonging to each owner can be encrypted using a separate encryption key to individually protect the data and reduce the likelihood that another party can gain unauthorized access to an individual user's data set.

The authentication and allocation of resources is often carried out by a separate trusted entity, such as an authorized host or server. This can provide a number of benefits. For example, the use of a separate server for user authentication provides an external coordinator to ensure that only authorized users gain access to the drive. Users can be authorized by being required to interface with correct authenticating information to both the drive and to the external server. Using an external server is also helpful in data allocation of a shared memory space. In effect, the server can operate as a referee to ensure that no one particular authorized user utilizes all of the available storage capacity in the drive to the detriment of the other authorized users who have also been granted storage rights.

Various embodiments are generally directed to an apparatus and method for managing data in a data storage environment. As explained below, some embodiments provide a data storage device having a controller circuit and a non-volatile memory (NVM). The data storage device is configured as a storage compute appliance to perform internal management and accesses of data sets stored to the NVM. The data sets may be associated with different users and may be individually encrypted using user based encryption keys. The data sets may be additionally encrypted by a storage compute appliance key that is stored internally by the appliance and is not transferred externally by or to the storage device.

The storage compute appliance is configured to authenticate users directly responsive to an authentication request from a user device. Upon authentication, the storage compute appliance accesses profile information in a profile data store, assigns permission and limit parameters to the authorized user, and allocates a selected portion of the NVM to the authenticated user. Thereafter, the authenticated user can operate to store data to the allocated portion of the NVM. In this way, user authentication is carried out by the individual data storage devices without reliance upon an external trusted authentication device (e.g., a trusted server, etc.).

The storage device can be configured as a key-value network connected drive so that a range of key values can be assigned to the authenticated user to limit the total amount of available storage to that user. Different allocation models can be utilized to accommodate multiple authenticated users of the NVM. In this way, no one authenticated user can utilize all (or more than an acceptable amount of) the available storage capacity of the NVM, while allowing the authentication operation to be carried out internally by the device. The allocation models can be adaptive so that, based on performance history, adjustments to an existing model among the various authorized users can be made by the storage device to enhance storage efficiency.

These and other features and advantages of various embodiments can be understood beginning with a review of FIG. 1 which shows a functional block representation of an exemplary data storage device 100. The device 100 includes a controller 102 and a memory 104. The controller 104 is a control circuit that provides top level control of data transfer operations between the memory 104 and a host device. The controller may be realized as a non-programmable hardware based control circuit and/or one or more programmable processors that execute programming (e.g., firmware) stored in a local memory. The memory 104 includes one or more forms of non-volatile memory (NVM) to store the user data. Examples include but are not limited to solid state semiconductor memory, rotatable memory, etc.

Figure 2:
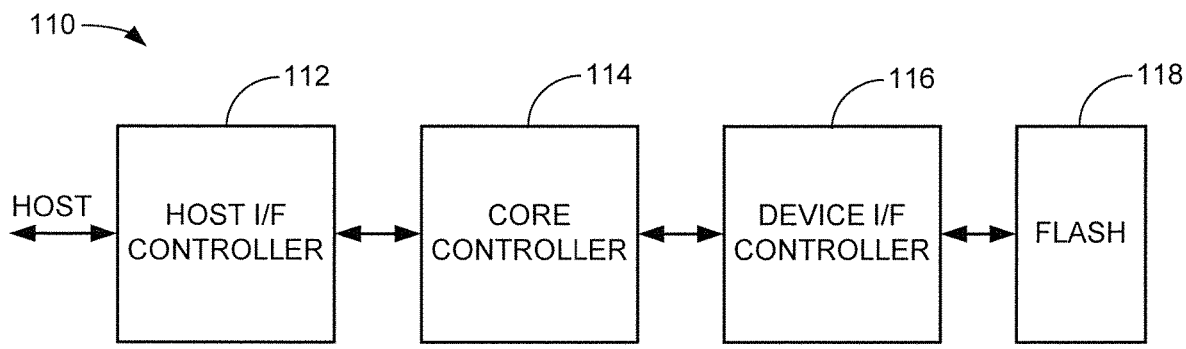
FIG. 2 is a functional block diagram of the storage device of FIG. 1 configured as a solid state drive (SSD).

FIG. 2 shows a data storage device 110 that corresponds to the data storage device 100 of FIG. 1. The device 110 is configured as a solid state drive (SSD) that uses flash memory as the NVM. This is merely for purposes of illustration and is not limiting. Other circuits and components may be incorporated into the SSD 110 as desired, but such have been omitted from FIG. 2 for purposes of clarity. The circuits in FIG. 2 may be incorporated into a single integrated circuit (IC) such as a system on chip (SOC) device, or may involve multiple connected IC devices.

The controller functions from FIG. 1 are carried out by a host interface (I/F) controller circuit 112, a core controller circuit 114 and a device I/F controller circuit 116. The host I/F controller circuit 112 may sometimes be referred to as a front end controller or processor, and the device I/F controller circuit 116 may be referred to as a back end controller or processor. Each controller 112, 114 and 116 includes a separate programmable processor with associated firmware in a suitable memory location, as well as various hardware elements, to execute data management and transfer functions. In other embodiments, a single programmable processor (or less than three programmable processors) can be configured to carry out each of the front end, core and back end processes using associated FW in a suitable memory location.

The front end controller 112 processes host communications with a host device (not separately shown). The back end controller 116 provides flash management electronics (FME) to manage data read/write/erase (R/W/E) functions with a flash memory 118. The flash memory 118 may be made up of multiple flash dies to facilitate parallel data operations. The core controller 114, also referred to as the main controller or middle controller, performs the primary data management and control for the device 110.

Figure 3:
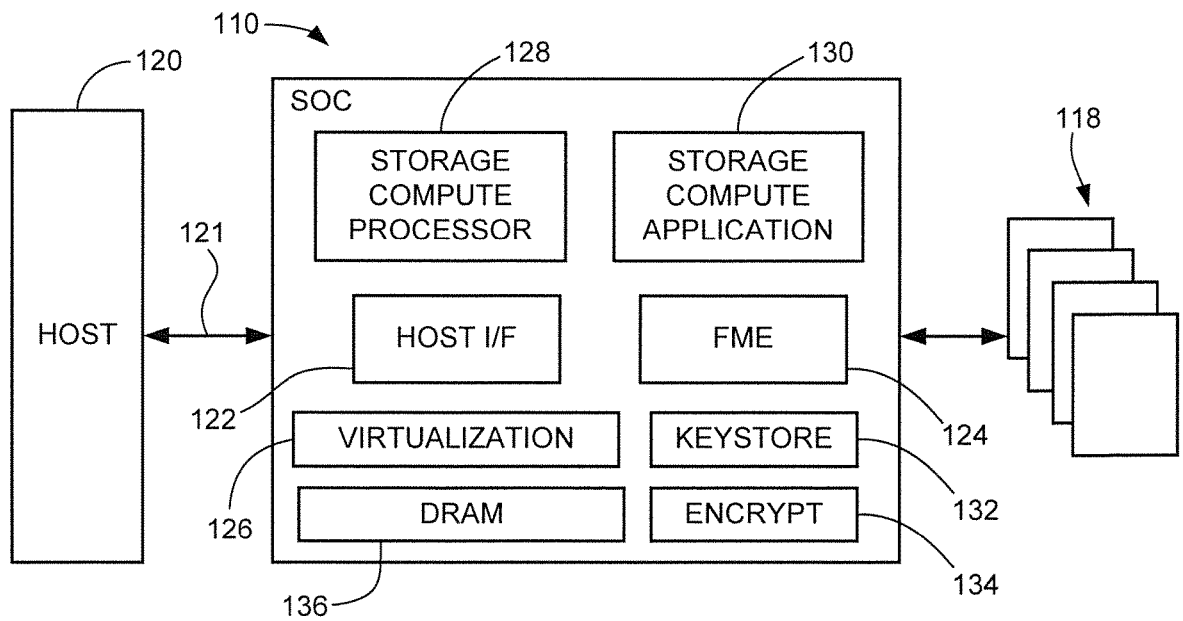
FIG. 3 illustrates aspects of the SSD of FIG. 2 configured as a storage compute appliance in some embodiments.

FIG. 3 is another functional diagram of the SSD 110 in conjunction with a host device 120. One or more suitable communication protocols are established to enable communication between the SSD 110 and the host device 120 via a host interface 121. Examples include but are not limited to PCIe, NVMe, Ethernet, SAS, etc.

Host I/F and FME blocks 122, 124 operate as described above to communicate with and transfer data between the flash memory 118 and the host 120 across the interface 121. The core controller 114 includes additional functionality including a virtualization layer 126, a storage compute processor 128 and a storage compute application 130. The virtualization layer 126 is provided for data mapping and management functions. The storage compute processor 128 executes the associated application 130 to perform specialized internal data analysis operations explained below.

A keystore 132 is a local memory that stores one or more encryption keys used by the storage compute processor 128 in conjunction with an encryption engine 134. A local volatile memory 136, such as in the form of DRAM, provides a scratch pad location to temporarily store the data utilized and generated by the storage compute processor.

The SSD 110 is selectively configured to operate as a storage compute appliance. As the term is used herein, a storage compute appliance is a specially configured data storage device having a host interface such as 121 to communicate with a separate host device such as 120, and has internal computational capabilities normally associated with a host level device so that applications can be carried out at the device level, with the results being transferred across the host interface.

Figure 4:
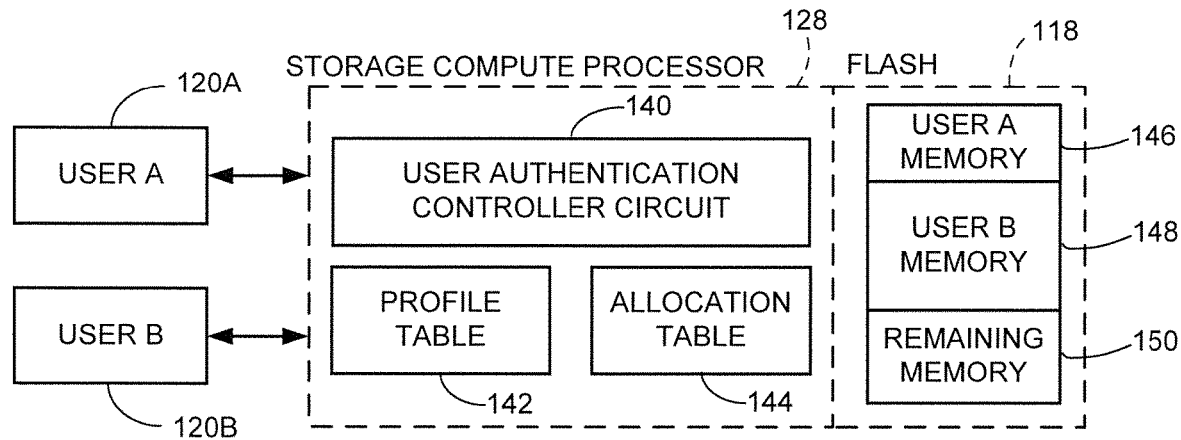
FIG. 4 shows the storage compute appliance of FIG. 3 in greater detail in accordance with some embodiments.

One such storage compute application involves the authentication of users and the associated allocation of memory from the NVM for use by the authenticated users. FIG. 4 shows aspects of the SSD 110 in a storage compute appliance mode of operation to authenticate and allocate NVM portions to a pair of user (host) devices 120A and 120B, which are associated with corresponding, respective Users A and B.

The storage compute processor 128 executes the associated storage compute application(s) 130 from FIG. 3 to implement a user authentication controller circuit 140, a profile table 142 and an NVM allocation table 144. The controller circuit 140 carries out the authentication operation to verify the respective devices 120A, 120B are from authorized users in a manner to be discussed below.

Upon authentication, profile information associated with the users is loaded to the profile table 142, and the allocation table 144 manages and tracks the available storage allocated to each user. As shown in the example of FIG. 4, User A is allocated memory portion 146, User B is allocated memory portion 148, and remaining unallocated memory is indicated at portion 150. While the respective allocated portions 146, 148 are shown to represent different amounts of storage for each user, in other cases each authorized user can be granted the same amount of storage from the shared NVM.

Figure 5:
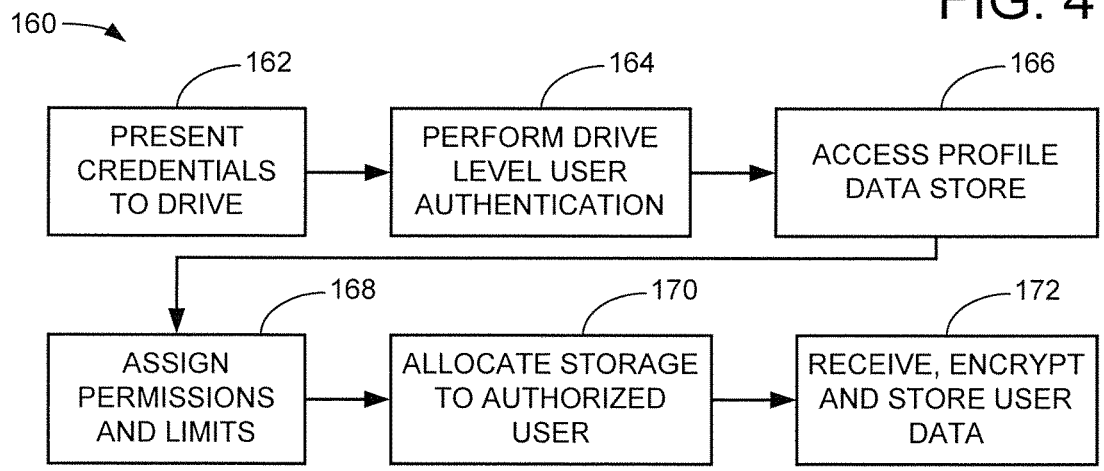
FIG. 5 shows the storage compute appliance of FIG. 4 during an authentication and allocation sequence.

FIG. 5 shows an example authentication sequence 140 carried out with a selected user device. The sequence is merely exemplary as any number of different authentication processes can be used as desired.

The sequence commences at block 162 with the user, via an associated host device, presents credentials to the drive (SSD 110). The credentials may include a request command and other information to uniquely identify the user to the drive. At block 164, the drive enacts an appropriate authentication application by the storage compute appliance and performs an internal drive level authentication of the user.

Upon authentication, the appliance accesses a profile data store at block 166 to obtain profile information associated with the authorized user. This enables the appliance to assign various parameters regarding user access including permissions and limits, block 168.

The appliance uses these parameters to allocate a portion of the storage of the NVM to the authorized user at block 170. Thereafter, the authorized user accesses the drive to carry out data I/O transfers with the NVM, block 172. The data transfers may include the receipt and encryption of user data by the control portions of the SSD 110 prior to storage of the encrypted data to the NVM 118.

Figure 6:
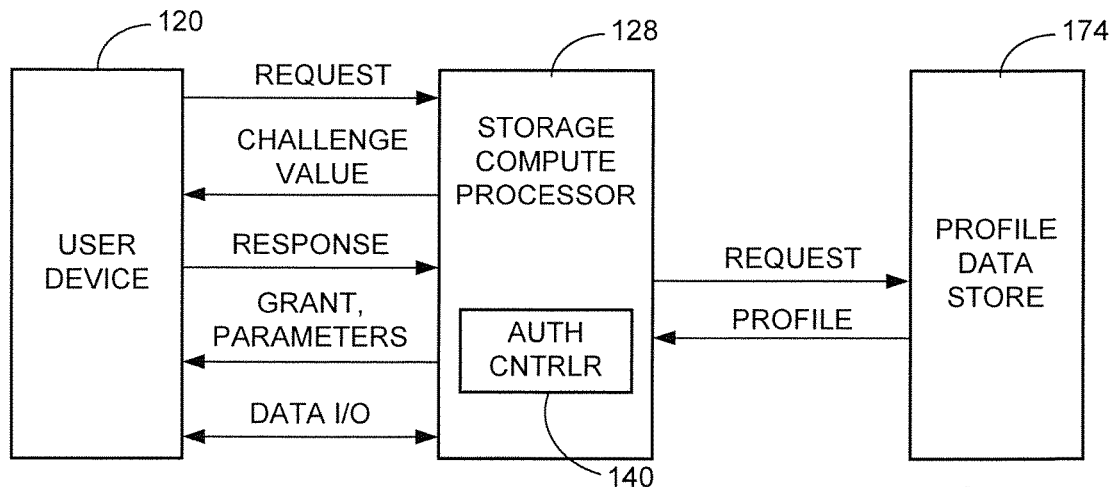
FIG. 6 is a sequence diagram illustrating operations that may be carried out by the storage compute appliance in some embodiments.

FIG. 6 shows a selected user device 120 in conjunction with the storage compute processor 128 of the SSD 110 to illustrate the sequence of FIG. 6 in greater detail. The drive level authentication may include the exchange of data between the processor 128 and the user device 120, including an encrypted challenge value and an encrypted response. This data exchange may include the use of digital signatures, public/private key encryption keys, tokens, etc.

The profile data store accessed at block 166 is denoted at 174 in FIG. 6. This may be an external memory, such as a trusted server or other memory location accessible by the SSD 110. In other cases, the profile data store can be internal to the SSD 110 so that no external communication is required to obtain the profile information.

Based on the profile information, an allocation grant is made to the user device 120. This grant may include the communication of address information and other parameters necessary to enable the user device 120 to commence with normal data I/O transfers with the NVM. In some embodiments, the SSD 110 is configured as a key-value device so that a set or range of key values are assigned to the user device that can be used to identify fixed sized blocks of user data for subsequent storage. Other arrangements can be used to restrict and maintain that the host device 120 does not exceed the allocated amount of storage in the NVM 118.

Figure 7:
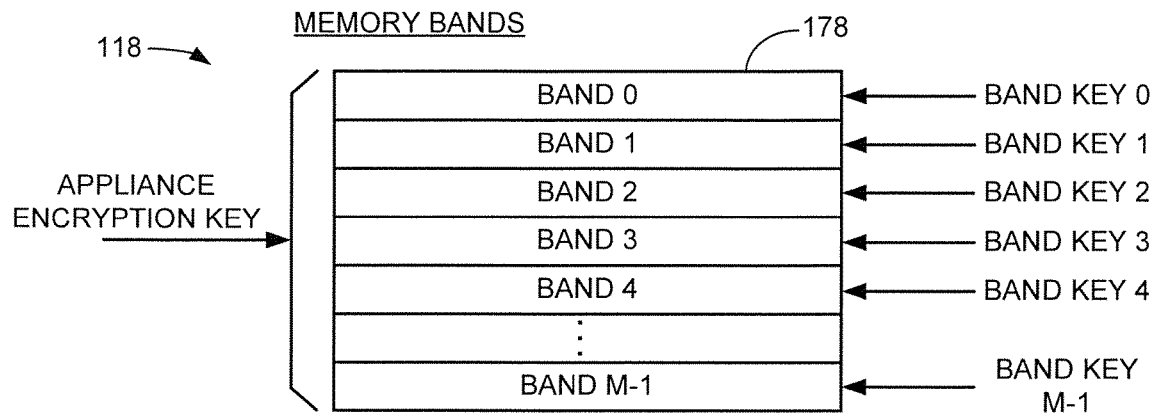
FIG. 7 shows an arrangement of a flash memory of the SSD into separate user bands.

FIG. 7 shows an arrangement of the NVM flash memory 118 in some embodiments. The flash memory is arranged into a plural number M bands 178. Other logical and/or physical arrangements of the memory can be used. Generally, each band 138 represents a selected portion of the total storage capability of the flash memory 118. Each band can be the same size, or the bands can be allocated with different storage capacities. While not limiting, it is contemplated that in at least some cases each band can be assigned to a different user (and/or host) in a shared storage device environment.

The data stored in each band can be encrypted using a separate encryption key, such as exemplified by band keys 0 to M−1. Additionally, all of the data in each band may further encrypted using a storage compute appliance encryption key. These respective keys may be stored and maintained in the keystore 132 and used by the encryption engine 134 in FIG. 3 as needed.

Figure 8:
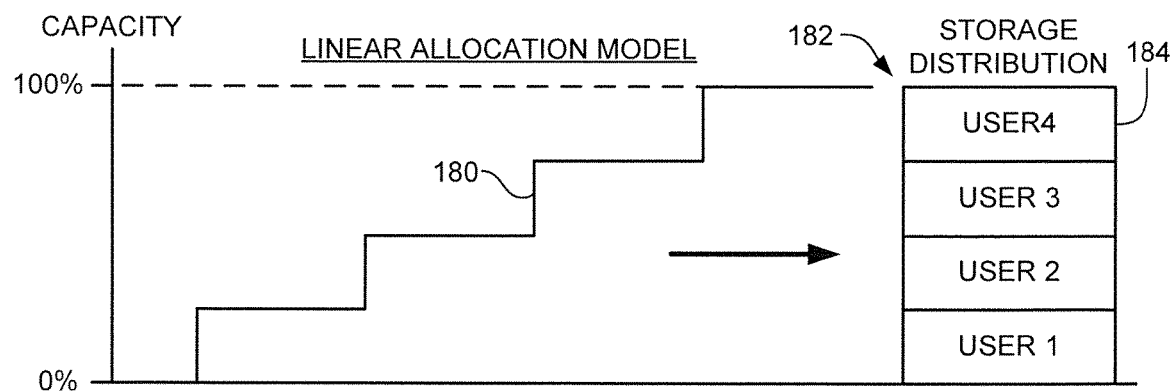
FIG. 8 illustrates a linear allocation model that can be used by the appliance to allocate separate portions of the storage capacity of the NVM to different authorized user host devices in some embodiments.

FIG. 8 shows a first allocation model that can be used to allocate storage of the NVM 118 to various users. FIG. 8 is a linear model for a maximum number X users, with each user allocated the same amount of the NVM. In the example of FIG. 8, there are a maximum number of four users (X=4), so that upon allocation, each user in turn is granted access to nominally 25% of the overall data storage capacity in the flash memory. Each allocated portion in FIG. 8 can correspond to one or more of the bands 178 in FIG. 7.

A step-wise allocation curve 180 shows the sequential allocations to the various users over time, and a stacked distribution 182 shows each of the allocated portions 184 to the respective users. The allocated portions 184 can be designated in a number of ways including as separate storage volumes, NVMe namespaces, key-value store ranges, etc.

It will be appreciated that it is up to the individual users to utilize the respective allocated memory as desired so that the diagram in FIG. 8 represents the available storage space owned by each user, rather than the actual amount of storage utilized by each user to store user data.

The respective data portions 184 may be segregated physically on different dies, planes, garbage collection units (GCUs), etc. within the NVM 118. However, it is contemplated that to enhance overall data transfer performance the various user data may be distributed throughout the flash memory array. The allocation table 144 (FIG. 4) and virtualization layer 126 (FIG. 3) will track the locations and amounts of the respective user data sets and enforce the limits established by the model.

The linear model of FIG. 8 is useful in situations where each user is allocated a selected amount of user data and each user is treated more or less equally by the system. In some cases, the total number of allowable users will not be known beforehand; instead, a list of available users greater than X can be associated with the appliance, and the first X authorized users that present credentials and request access will be granted rights. This provides an efficient utilization of the NVM space, since it can be presumed that those users that first present requests for allocated storage have a greater need for storage at the time.

Figure 9:
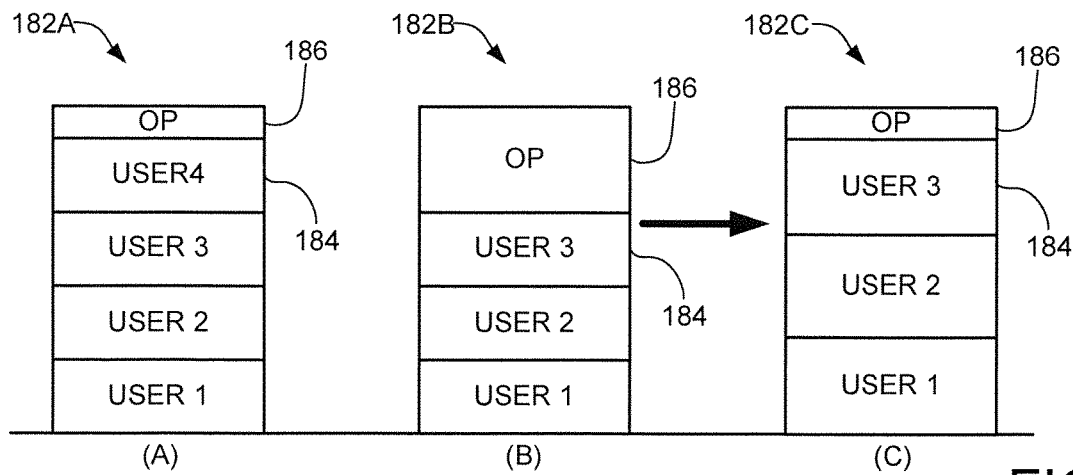
FIG. 9 shows different storage distributions that can arise from use of the model in FIG. 8.

FIG. 9 shows three storage distributions 182A, 182B and 182C that may be enacted by the appliance at different times using the linear allocation model of FIG. 8. The storage distribution 182A shows the four allocated portions 184 plus an overprovisioned portion 186 of the NVM 118. The overprovisioned (OP) portion 186 provides a small amount of additional space within the NVM to facilitate data migrations, defective blocks, garbage collection operations, etc. In this way, the OP portion 186 in distribution 182A does not count toward the overall data storage capacity of the NVM.

The OP portion 186 does not correspond to a particular location within the NVM, but instead represents additional "empty" space within the NVM to facilitate effective utilization of the NVM. This is particularly useful in erasable memories such as flash which require an open location in which to write current version data as GCUs are erased, reset and returned to an available GCU allocation pool.

Storage distribution 182B represents a situation where less than the X maximum available users have requested and received allocated storage. In this case, the remaining space is designated as OP data. Should a fourth user request access, an allocation for the fourth user can be made from the available OP. However, in some embodiments should only the three users be present in the system over a period of time, a user may request, or the appliance may automatically initiate, an expansion operation as shown by distribution 182C.

Distribution 182C in FIG. 9 shows that each of the existing users are granted additional storage. In this example, the Users 1-3 all receive increased NVM storage allocations of from nominally 25% each to nominally 33% each. The allocations can be evenly distributed as shown, or can be non-uniform based on various factors such as existing utilization. For example, if User 1 is using substantially 100% of the allocated storage while Users 2 and 3 are using significantly less than this, all of the available OP that would have gone to User 4 can be automatically given to User 1, so that User 1 would have 50% and Users 2 and 3 would retain 25% each.

FIG. 10 shows a second memory allocation model that can be implemented by the appliance in further embodiments. The second model is characterized as a non-linear allocation model so that the allocation follows a non-linear sequence, as denoted by allocation curve 190 and storage distribution 192 and allocated portions 194. As before, the model in FIG. 10 contemplates a maximum X authorized users, in this case four, but other maximum numbers of authorized users can be used as desired.

The allocation model operates to allocate the greatest amount of available storage to the first requesting user, followed by successively lesser amounts of storage to subsequent users. The sequence in FIG. 10 allocates nominally 40%, 25%, 20% and 15% to Users 1, 2, 3 and 4 in turn. Other respective ratios of the NVM storage can be used as required, so these are merely exemplary and are not limiting. The use of overprovisioned (OP) storage and subsequent adjustments among the various users can be carried out in a similar fashion as described above in FIG. 9.

In some cases, the appliance may initially allocate storage using a linear model and, over time based on observed behavior, migrate or otherwise transition to a non-linear model. Factors can include the actual utilization by each user (e.g., percent capacity of actual user data maintained in each allocated portion), the relative rate at which data commands (reads/writes) are carried out to access the user data, etc.

FIG. 11 shows an entry 200 of the allocation table 144 from FIG. 4 in some embodiments. The allocation table 144 can be arranged as a data structure in a memory of the SSD 110 with each entry 200 associated with a different one of the authorized users to track history information associated with the corresponding user. As shown in FIG. 11, each entry 200 can include a number of data fields including a user ID field 202, a data information field 204, an allocated storage field 206, a utilization field 208 and an access history field 210.

The user ID identifies the associated user (e.g., Users 1-4 in the foregoing examples, etc.). The date information stores data associated with when the allocation was made as well as other associated information such as most recent access, etc. The allocated storage indicates the amount, such as by percent or total storage capacity, of memory allocated to the user. The utilization represents the actual amount of the allocated storage that is used by the user, again expressed as a percentage or number of blocks, etc. The access history provides an indication in absolute or relative terms of the rate at which data accesses are performed by the associated user to the allocated portion of the NVM.

These and other metrics can be used by the appliance to make allocation decisions, including adaptive adjustments to the existing storage distribution. In multi-storage user environments, the appliance may communicate directly to another storage device to transfer (demote) an inactive or low level user to enhance storage capacity. This can be particularly useful in situations where multiple forms of storage devices are used in a mass storage system, such as SSDs and HDDs, etc.

It is contemplated that once an allocation is made to an authorized user, the data will continue to be stored by the storage device over time until the user relinquishes control, such as by reading back the stored data and transferring the data to another location. In other cases, however, the data allocations can be treated as session-based allocations so that the allocated portion of the NVM is temporary. This latter case can be envisioned, for example, in a multi-device storage array where the appliance serves as a hot data cache to provide faster access (e.g., SSDs) and cold data storage is provided by slower devices (e.g., HDDs).

FIG. 12 provides a storage system 220 having a multi-storage device enclosure 222 that houses and interconnects a plural number N of the storage devices 110. Without limitation, the enclosure 222 may include a housing that houses the N storage devices in a rack or other structure such as in a RAID (redundant array of independent discs), distributed object storage system, cloud computing network, etc. Each of the devices 110 is configured to operate as a separate storage compute appliance.

A host device 224 is configured to interact with each of the devices 110 via a single or multiple interfaces 226. As before, the host device 224 may take the form of a server, a controller, a computer, etc., and is contemplated as including at least one programmable host processor 228 and host local memory 230.

In the example of FIG. 12, various users communicate over a computer network with the host 224 to direct authentication and allocation requests to the various storage devices 110. Each storage device operates as an independent storage compute appliance to allocate portions of memory to the various users as described above. Thereafter, data I/O transfers are carried out in a normal fashion. The memory 230 can serve as a controller memory to provide a temporary data cache 232. One or more aggregator applications 234 can be executed as required to coordinate the data transfers.

In further embodiments, the storage compute appliances perform data analysis and evaluation across data sets stored to the various NVM portions, and provide summary results data to the data cache 232. Suitable embedded encryption keys and other control values can be used by the appliances to ensure no side channel data leakage occurs during the analysis. As desired, the individual storage compute appliances can communicate among themselves to perform level loading and other shared computational functions.

Different levels of authorized user access can be provided based on different inputs. For example, a first authorized user (AUTH USER 1) may be allowed to gain a first level of allocation data access, while a different, second authorized user (AUTH USER 2) is granted a higher level of access, higher priority, a greater amount of allocated memory, etc.

Figure 13:
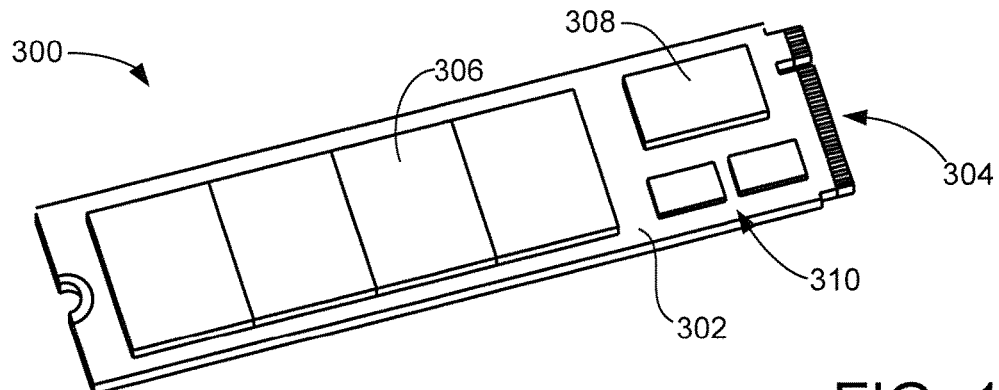
FIG. 13 is an isometric representation of a solid state drive (SSD) that can be configured as a storage compute appliance in accordance with some embodiments.
Figure 14:
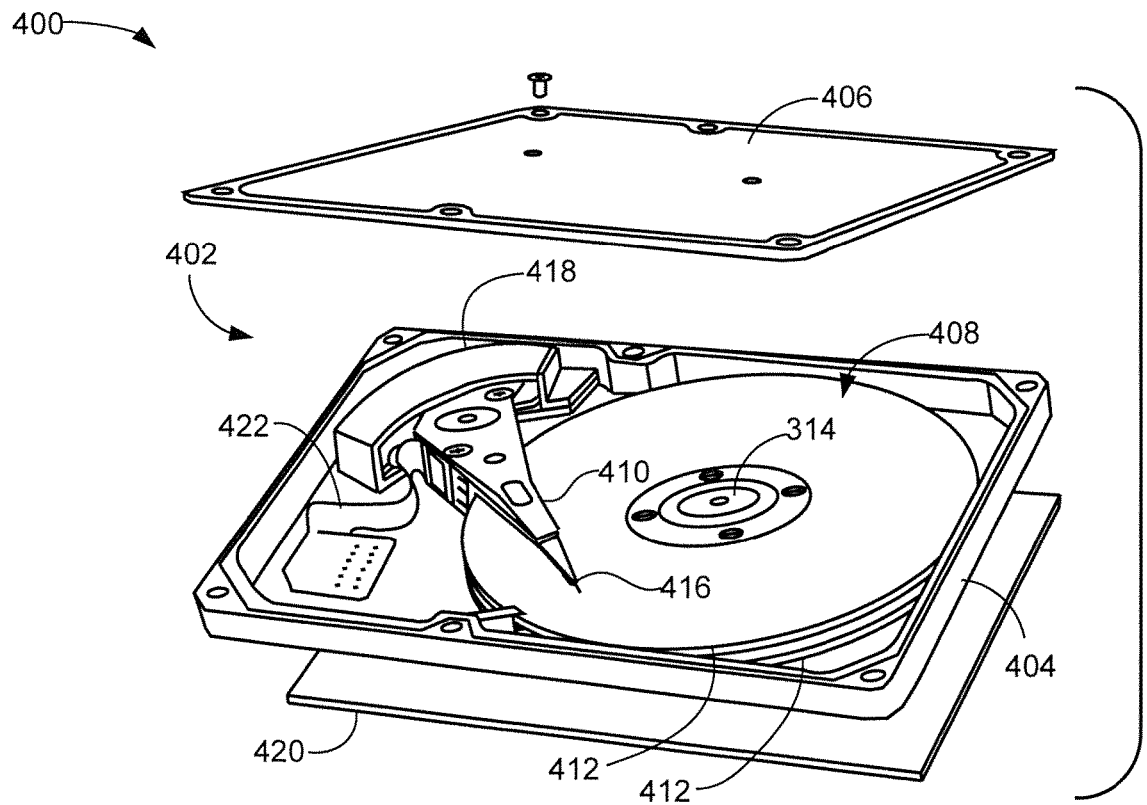
FIG. 14 is an isometric, exploded representation of a hard disc drive (HDD) or hybrid drive that can be configured as a storage compute appliance in accordance with some embodiments.

The embodiments discussed thus far have contemplated the data storage device with the storage compute functionality as corresponding to an SSD. FIG. 13 illustrates an SSD 300 similar to those discussed above that can be provided with such storage compute functionality. The SSD 300 is a plug-in module conforming to the M.2 SSD form factor standard.

The SSD 300 uses non-volatile NAND flash as the NVM, although other forms of memory can be used including and not limited to NOR flash, EEPROM, STRAM, PCRAM, RRAM, etc. The SSD 300 includes a base printed circuit board (PCB) 302 with an edge connector 304 to communicate with an associated host via a host interface. NAND flash memory integrated circuits are denoted at 306, and an SOC 308 serves as the top level controller circuit that incorporates the various controller circuitry of FIGS. 2 and 3, including the storage compute processor. Additional circuits, such as the DRAM, hardware encryption engine, etc. are generally represented by additional control circuit devices 310.

Other forms of data storage devices can be configured as storage compute appliances as well. FIG. 13 shows a data storage device 400 configured as a hard disc drive (HDD) or a hybrid drive with storage compute functionality as discussed above. As will be recognized, utilizes rotatable data recording media (discs) as the NVM store. A hybrid drive can use rotatable discs as well as another form of NVM memory, such as NAND flash.

The drive 400 includes an environmentally sealed housing 402 formed of a base deck 404 and top cover 406. Housed within the interior of the housing 402 is a disc stack 408 accessed by a rotary actuator 410. The disc stack includes a number of rotatable magnetic recording discs 412 (in this case, two) that are rotated at a constant high velocity by a spindle motor 414. The actuator 410 supports an array of data read/write transducers (heads) 416 adapted to write data to and read data from sectors arranged along concentric data tracks (not shown).

The actuator 410 is pivoted to advance the transducers 416 radially across the disc surfaces using a voice coil motor (VCM) 418. Control electronics, including circuitry corresponding to the controller 102 in FIG. 1 and the storage compute processor 128 in FIG. 3 are supported on an externally mounted printed circuit board (PCB) 420. A flex circuit assembly 422 includes a bulkhead connector to enable the communication of power and data signals between the interior of the device and the external PCB.

From this it can be seen that the storage compute functionality disclosed herein is memory agnostic, both as to form of the NVM as well as to the total storage capacity of the NVM. Generally, any individually addressable data storage device with NVM, a suitable controller circuit and a host interface can be configured to perform the storage compute processing of the present disclosure.

It will now be appreciated that the various embodiments can provide a number of benefits. Individual storage compute appliances can authenticate users and allocate appropriate amounts of NVM storage to multiple users in a shared environment. In some cases, the allocation can be made adaptive so that the individual amounts of storage are adjusted over time based on relative usage of the various users. Different levels of authorization can be utilized to provide authorized users with write access as compared to read access.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a non-volatile memory (NVM) having an overall data storage capacity to store user data presented via a host interface; and
   a controller circuit configured as a storage compute appliance circuit comprising a processor configured to authenticate a plurality of authorized users of the NVM via data exchanges between the authorized users and the processor over the host interface and to assign to each of the plurality of authorized users of the NVM a different portion of the NVM, the plurality of authorized users authenticated in a sequence over time from a first authorized user to a last authorized user, wherein the first authorized user is granted a largest portion of the overall storage capacity of the NVM, wherein the last authorized user is granted a smallest portion of the overall storage capacity of the NVM, and each intervening authorized user in the sequence is granted successively a corresponding portion of the overall storage capacity of the NVM that is smaller than the first authorized user and larger than the last authorized user, the processor further configured to monitor an access history by each of the authorized users and to adaptively adjust, via an allocation table using an allocation model, a size of at least one of the separate portions of the overall data storage capacity of the NVM allocated to a first one of the authorized users responsive to an access history of the NVM.

2. The apparatus of claim 1, wherein the allocation model is a non-linear model so that each of the authorized users is allocated a different percentage of the overall storage capacity of the NVM prior to issuance, by the plurality of authorized users, of any write commands to write data to the selected portions of the NVM.

3. The apparatus of claim 1, wherein each separate portion is assigned to a different authorized user and represents a maximum amount of the overall data storage capacity that the authorized user can utilize to store data, wherein the first authorized user utilizes all of the maximum amount of the separate portion assigned to the user to store user data, and wherein a second authorized user utilizes less than the maximum amount of the separate portion assigned to the second authorized user.

4. The apparatus of claim 1, wherein the processor authenticates each of the plurality of authorized users by issuing a cryptographically processed challenge value to a corresponding host device, receiving a cryptographically processed response value from the corresponding host device, and evaluating the cryptographically processed response value and the cryptographically processed challenge value.

5. The apparatus of claim 4, wherein upon authentication, the processor further accesses a profile data store arranged as a data structure in a memory to obtain at least one parameter associated with the corresponding authorized user and to allocate the corresponding separate portion of the NVM to the corresponding authorized user based on the at least one parameter from the profile data store.

6. The apparatus of claim 1, wherein the apparatus is characterized as a solid state drive (SSD), the processor comprises a programmable processor circuit configured to execute firmware stored in the processor memory, and the NVM comprises solid-state semiconductor non-volatile memory cells.

7. The apparatus of claim 1, wherein the apparatus is characterized as a hard disc drive (HDD) or hybrid drive, the processor comprises a programmable processor circuit configured to execute firmware stored in the processor memory, and the NVM comprises at least one rotatable magnetic recording disc.

8. A method comprising:
   configuring a data storage device as a storage compute appliance having a controller circuit and a non-volatile memory (NVM), the NVM having an overall data storage capacity to store user data presented via a host interface;
   authenticating, via a processor of the controller circuit, each of a plurality of authorized users of the NVM via data exchanges between the authorized users and the processor over the host interface without reference to an external trusted authentication device;
   allocating, via the processor of the controller circuit, a separate portion of the overall data storage capacity to each of the authorized users responsive to an allocation table stored in a processor memory, each separate portion representing a maximum percentage of the overall data storage capacity of the NVM available for use by the associated authorized user to store user data, each of the authorized users of the NVM granted a different portion of the overall data storage capacity of the NVM based on an order in which the authorization was granted to the respective plurality of authorized users; and adjusting, via the processor of the controller circuit using the allocation table, a size of at least one of the separate portions of the overall data storage capacity of the NVM allocated to a first one of the authorized users responsive to a second one of the authorized users not utilizing all of the selected portion of the NVM assigned to the second one of the authorized users.

9. The method of claim 8, wherein the allocation table uses a non-linear allocation so that each of the separate portions is smaller in size in an order corresponding to a sequence in which the plurality of authorized users are authorized in turn.

10. The method of claim 8, wherein the memory stores a list of a first number of potential authorized users that can present credentials for authentication, wherein the processor authenticates a second, lower number of the potential authorized users up to a predetermined threshold, and once the predetermined threshold is met, the processor denies further requests for authentication from any of the remaining of the potential authorized users.

11. The method of claim 8, wherein the plurality of authorized users is a plural number X, and each of the authorized users is allocated nominally 1/X of the overall data storage capacity of the NVM prior to any of the authorized users storing data to the NVM.

12. The method of claim 8, wherein the processor is configured to authenticate at any given time a maximum number X of authenticated users, wherein the processor initially authenticates a total number X−1 of the authenticated users and initially allocates 1/X of the overall storage capacity of the NVM to each, and wherein the processor subsequently increases the size of each of the selected portions to 1/(X−1) of the overall storage capacity of the NVM responsive to failure of an additional user to request authentication over a selected period of time.

13. The method of claim 8, wherein the data storage device is characterized as a key-value storage device, and the processor provides a separate set of key-values to each of the plurality of authorized users to identify data blocks stored to and retrieved from the NVM.

14. A storage compute appliance comprising:
a non-volatile memory (NVM) having an overall data storage capacity; and
a processor configured to divide the overall data storage capacity of the NVM among a plurality of authorized users so that each authorized user receives an associated percentage of the overall data storage capacity in which to store user data in accordance with an allocation table in a local memory, the processor dividing the overall data storage capacity prior to receipt of write commands from the authorized users to initiate writing of data to the NVM so that each of the authorized users of the NVM is granted a different portion of the overall data storage capacity of the NVM based on an order in which the authorization was granted to the respective plurality of authorized users, the processor further configured to adjust the allocation table by increasing the percentage of the overall data storage capacity assigned to a first authorized user and by decreasing the percentage of the overall data storage capacity assigned to a second authorized user responsive to utilization, by the first and second authorized users, in storing user data to the NVM.

15. The storage compute appliance of claim 14, wherein the processor is further configured to authenticate each of the plurality of authorized users via data exchanges between the plurality of authorized users and the processor over a host interface without reference to an external security server.

16. The storage compute appliance of claim 14, wherein each of the associated percentages add up to nominally 100% of the overall data storage capacity of the NVM.

17. The storage compute appliance of claim 14, wherein the processor divides the overall data storage capacity of the NVM among the plurality of authorized users prior to storage of data by the plurality of authorized users to the NVM.

18. The storage compute appliance of claim 14, wherein the apparatus is characterized as a solid state drive (SSD), the processor comprises a programmable processor circuit configured to execute firmware stored in the processor memory, and the NVM comprises solid-state semiconductor non-volatile memory cells.

19. The storage compute appliance of claim 14, wherein the apparatus is characterized as a hard disc drive (HDD) or hybrid drive, the processor comprises a programmable processor circuit configured to execute firmware stored in the processor memory, and the NVM comprises at least one rotatable magnetic recording disc.

20. The storage compute appliance of claim 14, wherein the processor is configured to authenticate at any given time a maximum number X of authenticated users, wherein the processor initially authenticates a total number X−1 of the authenticated users and initially allocates 1/X of the overall storage capacity of the NVM to each, and wherein the processor subsequently increases the size of each of the selected portions to 1/(X−1) of the overall storage capacity of the NVM responsive to failure of an additional user to request authentication over a selected period of time.

* * * * *